Dec. 23, 1930.  C. M. CRONKHITE  1,786,007
OPERATING MECHANISM FOR DIRIGIBLE HEADLIGHTS
Filed June 27, 1928
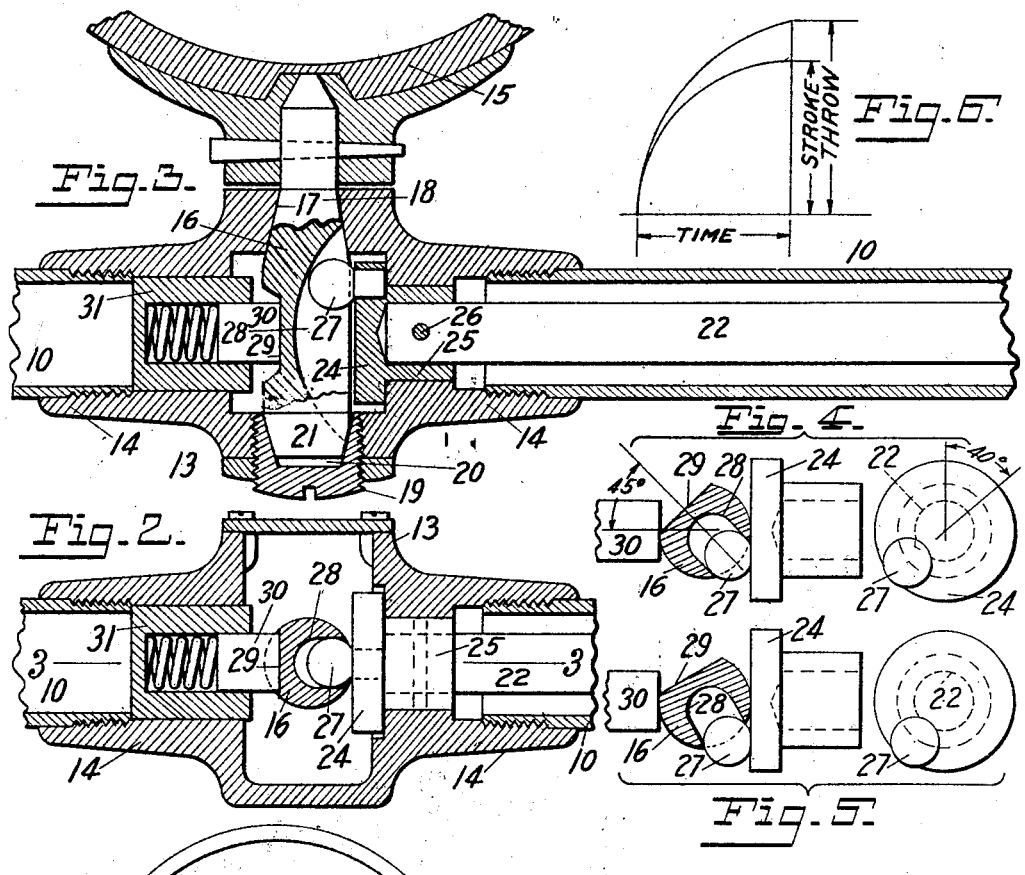
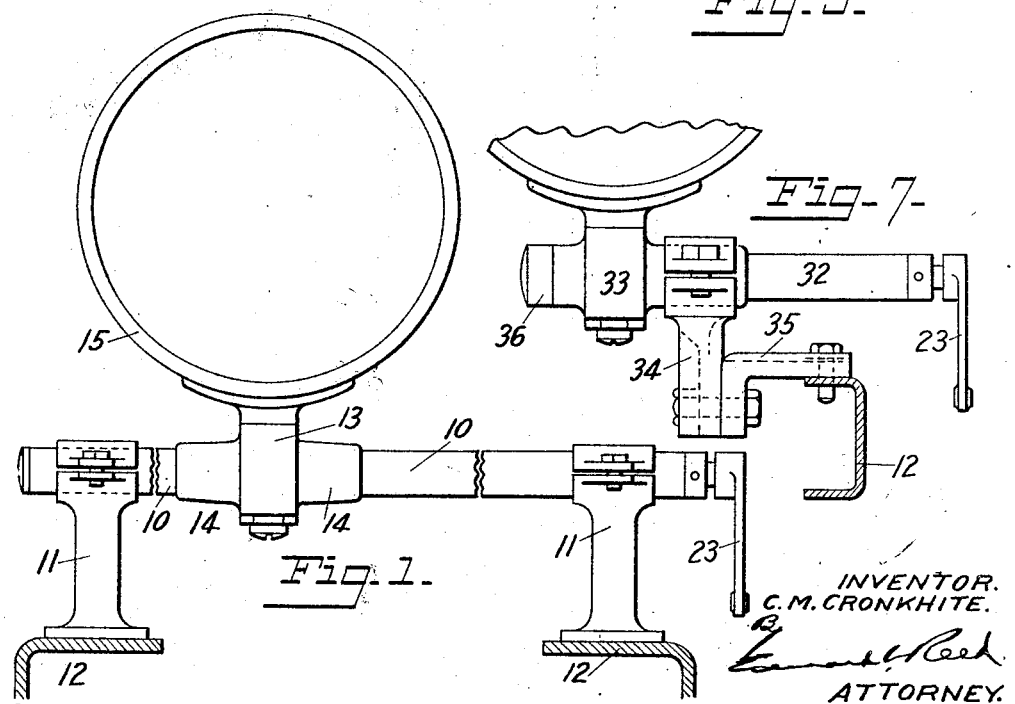
INVENTOR.
C. M. CRONKHITE.
ATTORNEY.

Patented Dec. 23, 1930

1,786,007

UNITED STATES PATENT OFFICE

CHARLES M. CRONKHITE, OF GLENDALE, CALIFORNIA, ASSIGNOR TO PILOT RAY CORPORATION, OF LOS ANGELES, CALIFORNIA, A CORPORATION OF DELAWARE

OPERATING MECHANISM FOR DIRIGIBLE HEADLIGHTS

Application filed June 27, 1928. Serial No. 288,665.

This invention relates to dirigible headlights for automobiles and the like and more particularly to operating mechanism for such headlights.

One object of the invention is to provide an operating mechanism for a dirigible headlight which will cause the light to be projected about a turn in the road in advance of the turning movement of the automobile.

A further object of the invention is to provide such an operating mechanism which will interrupt the turning movement of the headlight before the steering mechanism has reached the limit of its movement, thereby preventing the headlight from being turned so far that the light will be thrown off the road.

A further object of the invention is to provide such an operating mechanism with means for holding the headlight normally against movement.

Other objects of the invention will appear as the mechanism is described in detail.

In the accompanying drawings Fig. 1 is a front elevation, partly broken away, of a dirigible headlight mechanism embodying my invention; Fig. 2 is a horizontal sectional view taken through a portion of the operating mechanism; Fig. 3 is a vertical sectional view taken on the line 3—3 of Fig. 2; Fig. 4 is a detail view of the connection between the actuating device and the lamp supporting device showing the positions of the parts at the end of the initial movement of the actuating device; Fig. 5 is a similar detail view showing the positions of the parts after a further movement of the actuating device; Fig. 6 is a diagram illustrating the movement of the headlight with relation to the movement of the steering mechanism; Fig. 7 is a front elevation of a portion of a dirigible headlight mechanism showing a different manner of mounting the same.

In these drawings I have illustrated one embodiment of my invention with a slight modification thereof but it will be understood that this particular embodiment has been chosen for the purpose of illustration only but that the mechanism may take various forms without departing from the spirit of the invention.

In that particular form illustrated in Figs. 1 to 3, the headlight mechanism comprises a tubular supporting structure 10 supported at its ends by standards 11 mounted on the respective frame members 12 of the automobile, or upon the tubular cross member connecting the forward ends of the spring horns of an automobile. This supporting structure carries a housing 13 which is interposed between the two parts of the tubular structure and, in the present instance, is provided with laterally extending bosses 14 into which the tubular members are threaded. Mounted in the housing 13 is a supporting device for the headlight 15, and, in the form here shown, this supporting device comprises a spindle 16 rotatably mounted in the housing and projecting above the top thereof and to which the headlight may be secured in any suitable manner which will cause it to rotate with the spindle. Preferably the housing has in the upper portion thereof a tapered bearing 17 to receive a tapered portion 18 of the spindle, and has in its lower portion a screw threaded plug or cap 19 provided with a tapered socket 20 to receive a tapered lower end 21 of the spindle, thus enabling the bearing to be adjusted to provide a snug fit with the spindle.

Rotatory movement is imparted to the headlight supporting device or spindle 16 by means of suitable operating mechanism which connects the same with the steering mechanism of the automobile. As here shown, this operating mechanism comprises a shaft 22 rotatably mounted in the tubular supporting structure 10 and having connected therewith means, such as a crank arm 23, for connecting the same with the steering mechanism in such a manner that the movement imparted to the steering mechanism for steering the automobile will rock the shaft 22 about its longitudinal axis. The shaft 22 has connected therewith an actuating device which is of such a character and is so connected with the headlight supporting device that it will impart to that supporting device a quick initial movement, thus imparting to the headlight a movement in excess of the movement of the steering mechanism and causing the light to be projected about the turn of the road in advance of the turning movement of the automobile. Further, the actuating device is of such a character that the continued movement thereof, after the initial movement has been imparted to the headlight, will cause the movement of the headlight to be interrupted while permitting the actuating device and the steering mechanism, to continue their movements, thus preventing the headlight from being turned so far as to throw the light off the road when the steering mechanism is turned to the limit of its movement.

Preferably the actuating device comprises a rotatable member, such as a disk 24, mounted within the housing 13 and having a hub portion 25 journaled in one of the bosses 14 of the housing, this hub being hollow to receive the end of the shaft 22, which is rigidly secured thereto, as by means of a pin 26. The actuating member or disk 24 has secured thereto a part 27 which is spaced from the axis thereof and which projects toward the spindle and is adapted to engage a longitudinal contact surface 28 on the spindle. Preferably there are two contact surfaces arranged parallel one with the other and spaced apart to receive the projection 27 of the actuating device between them, these contact surfaces being so arranged that when the spindle is in its normal position they will lie in planes substantially parallel with the axis of the actuating device. In the present instance, the contact surfaces are provided by forming a longitudinal groove in one side of the spindle. The projecting part 27 of the actuating device is shown as having a spherical portion or head extending between the contact surfaces to reduce the frictional contact between these parts.

When the steering mechanism is in its normal position, that is, when the automobile is moving straight ahead, the actuating device will be so positioned that the projection 27 will be at or near its highest position, as shown in Fig. 3, and the headlight will be in its normal position. When the steering mechanism is actuated to turn the automobile the projection 27 will be rotated about the axis of the shaft 22, for example, to the position shown in Fig. 4, and its initial movement will be transverse to the length of the spindle, thus imparting a relatively great movement to the spindle and causing the headlight to be turned a distance in excess of the corresponding movement of the steering mechanism, as shown by the diagram in Fig. 6. As the actuating device continues its movement the travel of the projection is more nearly vertical and consequently the movement of the spindle gradually decreases and finally it is completely interrupted when the projection 27 reaches the position shown in Fig. 5, it being apparent that the actuating device can continue its movement from that point without affecting the position of the spindle.

For the purpose of holding the spindle and headlight normally against movement, while in their initial positions, the spindle is provided on one side thereof, preferably that side opposite the actuating device, with a flattened surface 29 which is engaged by the flat end of a spring pressed plunger 30 mounted in a socket member 31 which is carried by one of the bosses 14 of the housing 13. This plunger is pressed yieldingly against the flat surface of the spindle and holds the spindle against all rotatory movement until positive pressure is applied thereto by the actuating device.

In Fig. 7 I have shown a slightly different form of headlight mechanism. As there shown, the supporting structure comprises a single tubular member 32 which carries the housing 33 on which the headlight is mounted. This structure is supported by a standard 34 which is rigidly secured to a bracket 35 mounted on one of the frame members 12, or upon the tubular cross member connecting the forward ends of spring horns of an automobile. The housing 33 is provided on that side opposite the tubular member 33 with a cap 36 which will permit access to be had to the spring pressed plunger.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mechanism of the character described, a tubular structure adapted to be mounted on a supporting structure, a housing carried by said tubular structure, a spindle journaled in said housing and having contact surfaces extending lengthwise thereof and spaced apart, said spindle having means for connecting the same with a device to be operated, a shaft rotatably mounted in said tubular structure and having means for connecting the same with operating mechanism, a member mounted in said housing, connected with said shaft for rotation therewith and having a part extending between said contact surfaces, said spindle having a flattened surface, and a spring pressed plunger mounted in said housing and engaging said flattened surface to hold said spindle normally against movement.

2. In a mechanism of the character described, a spindle mounted for rotary movement about a longitudinal axis, having means for connecting the same with a device to be operated and having a longitudinal groove in one side thereof, and an actuating device comprising a member movable about an axis transverse to the axis of said spindle and having a stud extending substantially parallel with and spaced radially from the axis thereof and projecting into said groove to engage the walls of said groove at one side of the axis of said spindle.

3. In a mechanism of the character described, a spindle mounted for rotatory movement about a longitudinal axis, having means for connecting the same with a device to be operated and having a longitudinal groove in one side thereof, and an actuating device comprising a member movable about an axis transverse to the axis of said spindle and having a stud extending substantially parallel with and spaced radially from the axis thereof and projecting into said groove to engage the walls of said groove at one side of the axis of said spindle, said stud having a substantially spherical head to engage the walls of said groove.

4. In a mechanism of the character described, a spindle mounted for rotatory movement about a longitudinal axis, having a longitudinal slot opening through one side thereof and having means for connecting the same with a device to be operated, and an actuating device comprising a member movable about an axis transverse to the axis of said spindle and having a part arranged substantially parallel with and spaced radially from the axis thereof, said part extending into said slot and engaging the walls thereof on that side of the axis of said spindle adjacent to said actuating device.

5. In a mechanism of the character described, a spindle mounted for rotatory movement about a longitudinal axis and having means for connecting the same with a device to be operated, an actuating device comprising a member movable about an axis transverse to the axis of said spindle and having a part spaced radially from the axis thereof and projecting toward said spindle, said spindle having a contact surface arranged in the path of said part and having a flattened surface on one side thereof, and a spring pressed device acting on said flattened surface of said spindle to hold the latter against movement until positive pressure is applied thereto by said actuating device.

6. In a mechanism of the character described, a tubular structure adapted to be mounted on a supporting structure, a housing carried by said tubular structure, a spindle journaled in and enclosed by said housing, extending transversely to said tubular structure and having a longitudinal groove in that side thereof adjacent to said tubular structure, said spindle having means for connecting a device to be operated with one end thereof, a rotatable shaft extending through said tubular structure and having at one end means for connecting the same with operating mechanism, a member mounted in said housing and secured to the other end of said shaft for rotation therewith, and a stud carried by said member, arranged substantially parallel with and spaced from the axis of said shaft and extending into the groove in said spindle to engage the opposed walls thereof.

In testimony whereof, I affix my signature hereto.

CHARLES M. CRONKHITE.